United States Patent [19]

Mastors et al.

[11] Patent Number: 5,826,021
[45] Date of Patent: Oct. 20, 1998

[54] DISCONNECTED WRITE AUTHORIZATION IN A CLIENT/SERVER COMPUTING SYSTEM

[75] Inventors: Robert N. Mastors; Michael J. Stillwell, both of Colorado Springs, Colo.

[73] Assignee: Sun Microsystems, Inc., Palo Alto, Calif.

[21] Appl. No.: 715,183

[22] Filed: Sep. 17, 1996

[51] Int. Cl.⁶ ................................................. G06F 12/14
[52] U.S. Cl. ........................... 395/200.33; 395/200.49; 707/202
[58] Field of Search ............................. 707/9, 10, 202; 705/18, 44; 711/163, 164; 395/200.33, 200.54, 200.55, 200.59, 187.01, 188.01, 200.49; 380/3, 4, 23, 24, 25

[56] References Cited

U.S. PATENT DOCUMENTS

| | | | |
|---|---|---|---|
| 4,864,616 | 9/1989 | Pond et al. | 380/25 |
| 5,052,040 | 9/1991 | Preston et al. | 380/4 |
| 5,235,642 | 8/1993 | Wobber et al. | 380/25 |
| 5,239,648 | 8/1993 | Nukui | 380/25 |
| 5,274,824 | 12/1993 | Howarth | 395/200.59 |
| 5,560,008 | 9/1996 | Johnson et al. | 395/200.59 |

FOREIGN PATENT DOCUMENTS

| | | |
|---|---|---|
| 398494 | 11/1990 | European Pat. Off. . |
| 456920 | 11/1991 | European Pat. Off. . |
| 714066 | 5/1996 | European Pat. Off. . |
| WO 95 24685 | 9/1995 | WIPO . |

OTHER PUBLICATIONS

M. Satyanarayanan, Coda: A Highly Available File System for a Distributed Workstation Environment, IEEE, pp. 114–117, Dec. 1989.

M. Satyanarayanan et al., A Highly Avaiable File System for a Distributed Workstation Envionrment, IEEE, pp. 447–459, Apr. 1990.

Rainer Tobbicke, Distributed File Systems: Focus on Andrew File System/Distributed File Service (AFS/DFS) Dec. 1994.

Primary Examiner—Parshotam S. Lall
Assistant Examiner—Patrice L. Hinder
Attorney, Agent, or Firm—Homer L. Knearl; William J. Kubida; Holland & Hart LLP

[57] ABSTRACT

Apparatus and a method for a client/server computing system having an optimized log file system for replaying client disconnect write operations to a server when the server becomes available to the client. Data in the unauthorized disconnect write operations to a target file at the client are prevented from being copied to the server when the server becomes available. When there is a write request for a target file at the client, and the client detects the target file has already been written, the credentials with the write request are compared to the store credentials from a previous write to the same target file. If the request credentials are the same as the stored credentials, data from the write request is written to the target file effectively adding more data to the target file. If the request credentials are not the same as the stored credentials the write request is suspended at the client. When the client detects that the server is available, the stored credentials of the target file are retrieved from the credentials table, and the target file is sent along with the stored credentials to the server.

20 Claims, 4 Drawing Sheets

DISCONNECTED WRITE AUTHORIZATION IN A CLIENT/SERVER COMPUTING SYSTEM

CROSS REFERENCE TO RELATED APPLICATION

Copending, commonly assigned patent application, Ser. No. 08/654,330, entitled "Log File Optimization In A Client/Server Computing System" by Robert Mastors filed May 28, 1996, teaches an optimized log file system, in which the present invention may be used, and is incorporated herein by reference.

BACKGROUND OF THE INVENTION

Field of the Invention

The present invention relates to write operations performed by a client computing station in a client/server computing system while the server or network is inoperative. More particularly, the present invention relates to management of write authorization to copy client disconnected write files to the server, when the server again becomes available, where the copying of files to the server is based upon optimized log files maintained in the client while the server was unavailable.

Description of Problem Solved by Invention

In a client/server computing system operating over a network, file system architectures are employed in which the server stores all files created at the client in the computing system. In such a computing system, when an application program, operating on the client, needs to write data to a file, the file data is transferred over the network to the server for storage in the file maintained by the server. If the client is equipped with a local disk cache, the data is also optionally written to the local disk cache of the client. Under normal operating conditions, such a computing system can operate smoothly.

However, when the server becomes inoperative (i.e., crashes) or if the network connection between the server and the client becomes inoperative, then the client is unable to write new file data over the network to the server for storage at the server. This period of server unavailability is also referred to as disconnected operations.

In order to make the client/server computing system more fault-tolerant, it is desirable to enable the user of an application program running on the client to be able to modify or write data to a file even during unavailability of the server. During the period of server unavailability, a log file can be created and maintained in the client for collecting a list of operations performed by the client during the period of unavailability of the server. The log file generally includes the type of operation performed and the data associated with the operation, along with an identification of the file upon which the operation was performed. Once the server again becomes available, the client utilizes the log file to "replay" or "roll" the operations performed during the unavailability of the server, thereby attempting to insure the consistency between the server's version of the file and the client's version of the file.

Such a log file may be optimized to reduce the size of the log file in the client. An example of an optimized log file operation is described in the above cross-referenced patent application entitled "Log File Optimization In A Client/Server Computing System."

A problem arises in log file optimization due to the fact that write authorization for a file is checked at the server. Log file optimization can result in an unauthorized write at a disconnected client circumventing the authorization check at the server when the server becomes available. In FIG. 1 the data flow for a normal write to file "A1" is illustrated. There are three write to file events illustrated. Event 1 and event 3 are write operations by a user with credentials "C1." Event 2 is a write operation by a user with credentials "C2." In a normal connected write operation, the server checks the credentials of the user before authorizing the write operation at the server and affirming or granting permission for the corresponding write operation at the client cache. Accordingly for each event, each of the data flow lines to the server show a credential check.

If the second user having credentials C2 is not authorized, then in a normal write operation, only events 1 and 3 will result in writes to file A1. Thus file A1 will contain data—ABC and 123—; file A1 will not contain data—XYZ—from event 2.

Now suppose that the server is unavailable. Since there is no credential check at the client, if the three write to file events (dashed lines in FIG. 1) occur as disconnected writes, file A1 in the client cache will contain data: ABC, XYZ and 123. Now when the server becomes available, file A1 will be transferred in a single write operation to the server. During this single write, the server will do one credential check for the entire file (i.e. one credential check per write operation). Since the first write carried credentials C1, which are authorized, the server will see credentials C1 and authorize the writing of ABC, XYZ and 123 to file A1 in the server. The unauthorized data XYZ has slipped through the security check at the server because the optimized log file has simplified the writing of file A1 to a single write operation of the entire file to the server. Accordingly, there is a need to insure that only authorized data for disconnected write operations is copied to a server when using an optimized log file operation.

SUMMARY OF THE INVENTION

In accordance with the present invention, the above problems have been solved in a client/server computing system having an optimized log file system for replaying client disconnect write operations to a server when the server becomes available to the client by a method for preventing data in unauthorized disconnect write operations to a target file at the client from being copied to the server when the server becomes available. When there is a write request for a target file at the client, the process begins by detecting at the client whether or not the target file has already been written. The write request contains data and request credentials; the request credentials are the authorization credentials for the write operation which will ultimately be tested for acceptability at the server.

If the detecting step detects the target file has not already been written at the client, the request credentials are placed in a credentials table as stored credentials indexed by a target file identifier. Also the data from the write request is written to the target file at the client.

If said detecting step detects the target file has already been written, the request credentials are compared to the stored credentials in the credentials table. If the request credentials are the same as the stored credentials, data from the write request is written to the target file effectively adding more data to the target file. If the request credentials are not the same as the stored credentials, the write request is suspended at the client.

As a further feature of the invention when the client detects that the server is available, the stored credentials of the target file are retrieved from the credentials table, and the target file is sent along with the stored credentials to the server.

As another feature of the invention, the stored credentials and the target file are received by the server from the client and the stored credentials are tested to indicate if the stored credentials are acceptable or unacceptable. If the stored credentials are acceptable, the entire target file is written to the server. If the stored credentials are unacceptable, an error message is sent to the client.

In another feature of the invention, when the client detects that the server is available, the suspended write operations at the client are awakened.

The above computer implemented steps in another implementation of the invention are provided as an article of manufacture, i.e., a computer program stored in a computer storage medium or stored in a transmission medium. A computer storage medium refers to any type of storage element used in a computing system. A transmission medium refers to elements in a communication network which store computer program instructions being downloaded from a source to a destination across the communication network. Either medium stores a computer program of instructions for a computer enabling the computer to perform a computer process including the above described steps.

In a machine implementation of the invention, an apparatus in a client/server computing system for preventing unauthorized data written during disconnected writes at the client from being copied to the server when the server becomes available. The apparatus has a check module, a client write module, and a suspend module. The check module at the client responds to a write to file request for a predetermined file and checks for a previous disconnected write to said predetermined file. The client write module writes data contained in the write to file request to the predetermined file at the client if there is no difference or change in credentials between credentials accompanying the write to file request and previous credentials for a previous disconnected write to the predetermined file. The suspend module at the client suspends the write to file operation if there is a change in credentials between credentials accompanying the write to file request and the previous credentials.

As another feature of the invention, a storage module at the client stores credentials accompanying a write to file request if the write to file request is the first such request for said predetermined file whereby the credentials so stored are thereafter the previous credentials.

As another feature of the invention, the client writing module also writes data contained in the write to file request to the predetermined file if the write to file request is the first such request for the predetermined file.

As a further feature of the invention, a send module at the client, in response to the server becoming available after disconnected write to file operations, sends the predetermined file along with the previous credentials to the server. A server write module receives the predetermined file and writes the predetermined file at the server if the previous credentials are accepted by the server.

As another feature of the invention, an awaken module at the client, in response to the server becoming available after disconnected write to file operations, awakens the write to file operations suspended by the suspend module.

The great utility of the present invention is that unauthorized data from disconnected write operations at the client can not circumvent the security of the server even though an optimized log file system is being used during disconnect.

The foregoing and other features, utilities, and advantages of the invention will be apparent from the following more particular description of a preferred embodiment of the invention as illustrated in the accompanying drawings.

DETAILED DESCRIPTION OF PREFERRED EMBODIMENTS

Figure 1:
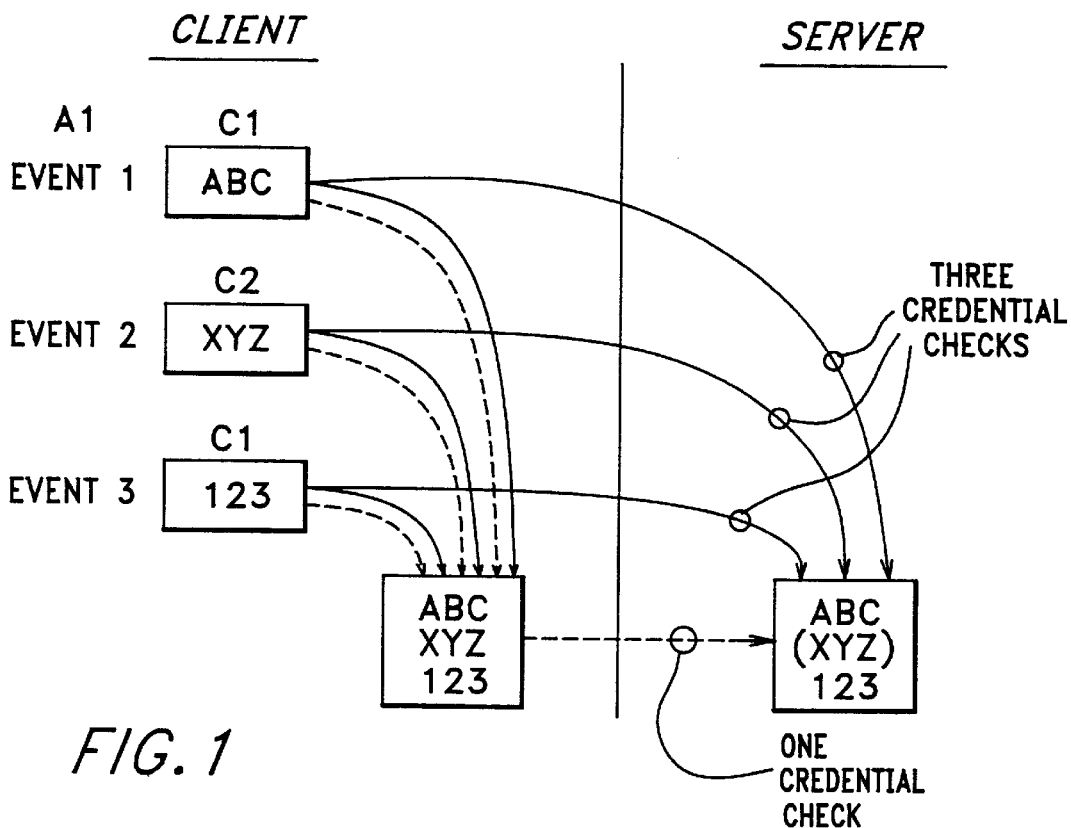
FIG. 1 illustrates data flow for three write to file events when the server is connected (solid lines) during the write events and when the server is disconnected (dashed lines) during the events.
Figure 2A:
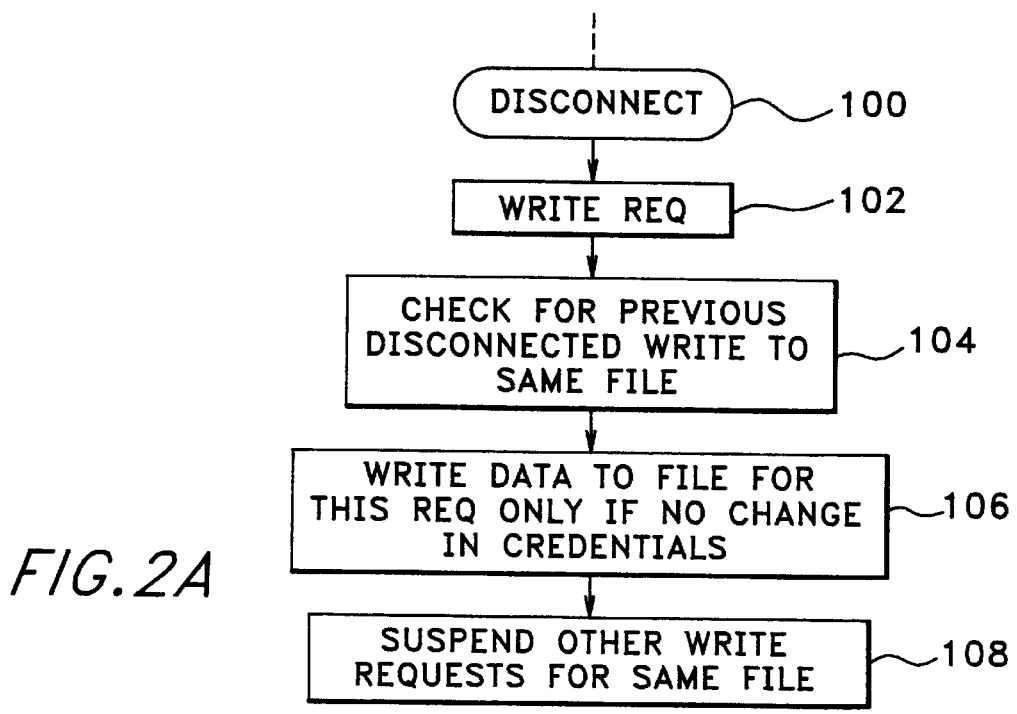
FIG. 2A and FIG. 2B illustrate the logical operations of a preferred embodiment of the invention as those operations are performed at a client and a server to insure that disconnected writes at the client do not circumvent the security of the server.
Figure 2B:
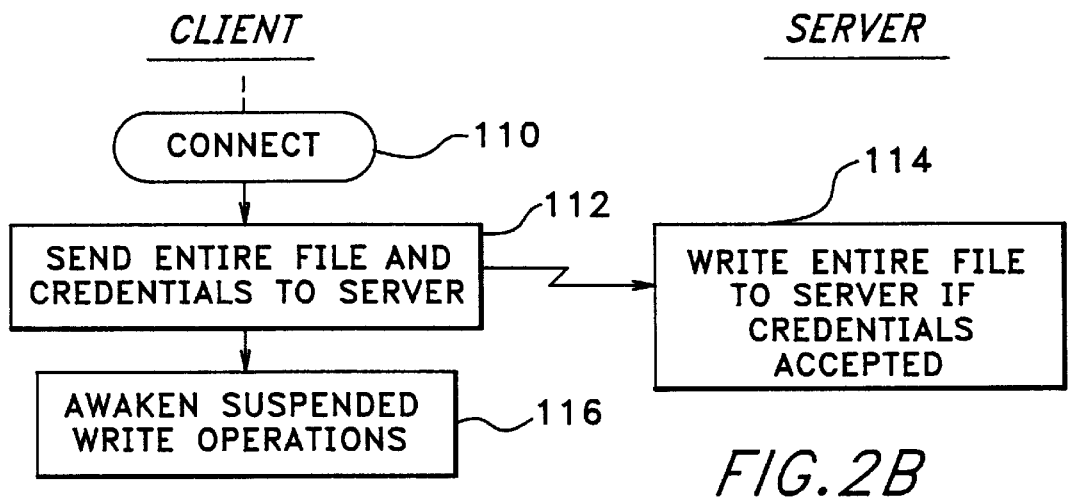

In a preferred embodiment of the invention as illustrated in FIG. 2A, the disconnected write operation to client cache is conditioned by the credentials of the user requesting the write operation. In FIG. 2B, the logical operations for copying a file of disconnected writes from client to server are illustrated.

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

FIG. 2A illustrates the logical operations in accordance with a preferred embodiment of the invention performed at the client when disconnected write operations occur. In FIG. 2A, the disconnect condition 100 exists or is detected when the write request is detected at operation 102. The write request contains data to be written to a file and authorization credentials for the write operation. The client in module 104 checks whether there is a previous disconnected write request for the same file. In response to an indication of a previous disconnected write for the same file, operation 106 proceeds to write the date in the request to the file only if there is no change in credentials between the previously write to the file and the present write request for the same file.

Otherwise, in operation 108 all write requests during disconnect having credentials, that do not match the credentials for the previous disconnected write to the same file, are suspended. In effect, the logical operations 104, 106 and 108 allow writes to the file if the writes have the same credentials. All other writes with different credentials from a previous disconnected write are suspended at the client.

In FIG. 2B the preferred embodiment for copying a file containing disconnected writes from the client to the server is illustrated. The connect condition 110 is the triggering event for copying a disconnected write cache file from the client to the server. When the connect condition or server availability is present then operation 112 sends the file and the credentials for that file to the server. Operation 114 at the server will write the entire file to the server only if the credentials are accepted by the server. Thus, any number of writings to the file at the client are transferred in a single write for the entire file from the client to the server. However, the file is not written to the server unless the credentials received for the file from the client are acceptable to the server. Back at the client, after a file is copied from the client to the server, operation 116 awakens the write operations previously suspended by operation 108 in FIG. 2A. These awakened write operations will proceed and have their credentials checked by the server in the normal, connected write operation.

In summary, during a disconnect, the disconnect writes to the client cache are restricted to writes with one set of credentials. All other writes with other credentials are suspended. Subsequently, when the server again becomes available, the disconnected written file is sent to the server, but will be written in the server file only if the credentials are acceptable. Since all disconnected writes for the written client file have the same credentials, no illegal writes with unauthorized credentials may slip through and be written inadvertently at the server.

The operating environment, in which the present invention is used, encompasses a stand-alone computing system as well as the general distributed computing system. In the distributed computing system, general purpose computers, work-stations, or personal computers are connected in a client-server arrangement via communication links of various types, wherein programs and data, many in the form of objects, are made available by various members of the system.

Figure 3:
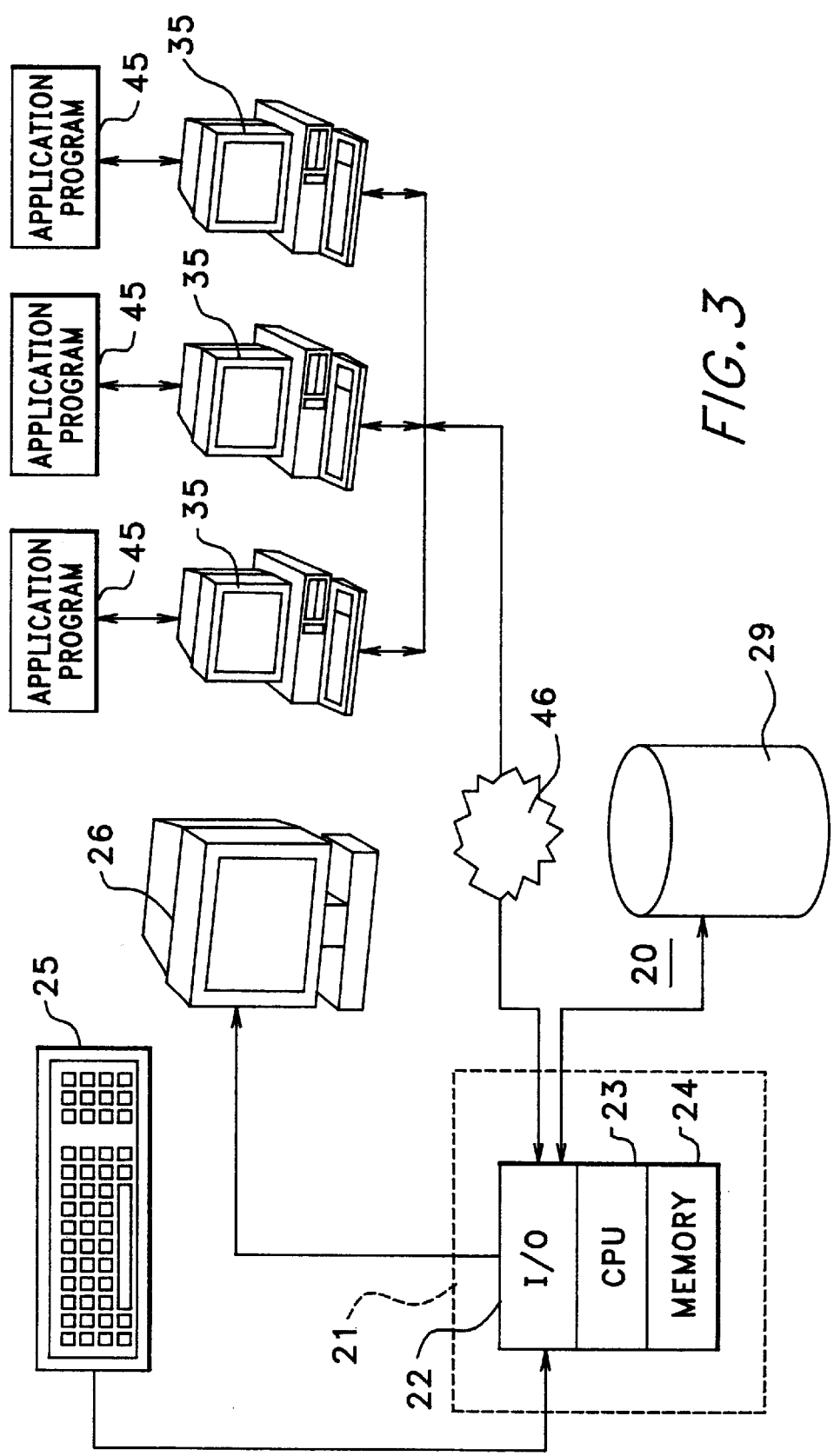
FIG. 3 illustrates a distributed processing computer system with a server and multiple clients connected in a communications network to perform the logical operations of the invention.

Some of the elements of a stand-alone computer or a general purpose work-station computer are shown in FIG. 3. In accordance with the invention, users at remote work-stations in a network, such as client processors 35, communicate through the network to a computer server 20. Server 20 includes processor 21 having an input/output section 22, a central processing unit 23, and a memory section 24. The input/output section 22 is optionally connected to a keyboard 25, a display or monitor 26, and a disk storage unit 29. The input/output unit 22 includes a communications adaptor (not shown) for communicating on the network 46 to the remote client stations 35.

Application programs 45 operate on client station 35 which may access or modify files maintained by server 20. The computer program products to effectuate the apparatus and methods of the present invention may reside in the memory section 24, or on the disk storage unit 29 or similar storage media (not shown), or reside on storage mediums used by clients 35. Examples of computing systems that may be used as either a server 20 or a client 35 include the SPARC[1]™ systems offered by Sun Microsystems™, Incorporated, personal computers offered by IBM Corporation and by other manufacturers of IBM compatible personal computers and systems running the UNIX[2], OS/2[3], HP-UX, AIX[3], DOS, etc. operating systems.

[1]SPARC is a trademark of Sun Microsystems, Inc.
[2]UNIX is a trademark Licensed by X/Open Company Ltd.
[3]OS/2 and AIX are trademarks of IBM Corporation.

As shown in FIGS. 3, client 35 and server 20 communicate over network 46 which provides client 35 with access to the files maintained on disk 29 of the server. Conversely, client 35 also transfers file data over network 46 for files maintained on the server.

The client generally creates file data in response to a request by an application program 45 (FIG. 3), running on the client 35, to store or write data associated with a file. If server 20 is unavailable either because the network connection 46 is inoperative, server 20 has crashed, or otherwise, then the client 35 cannot transfer the file data to the server. Instead client 35 writes data to a file at the client and creates an optimized log file of the disconnected writes.

Figure 4:
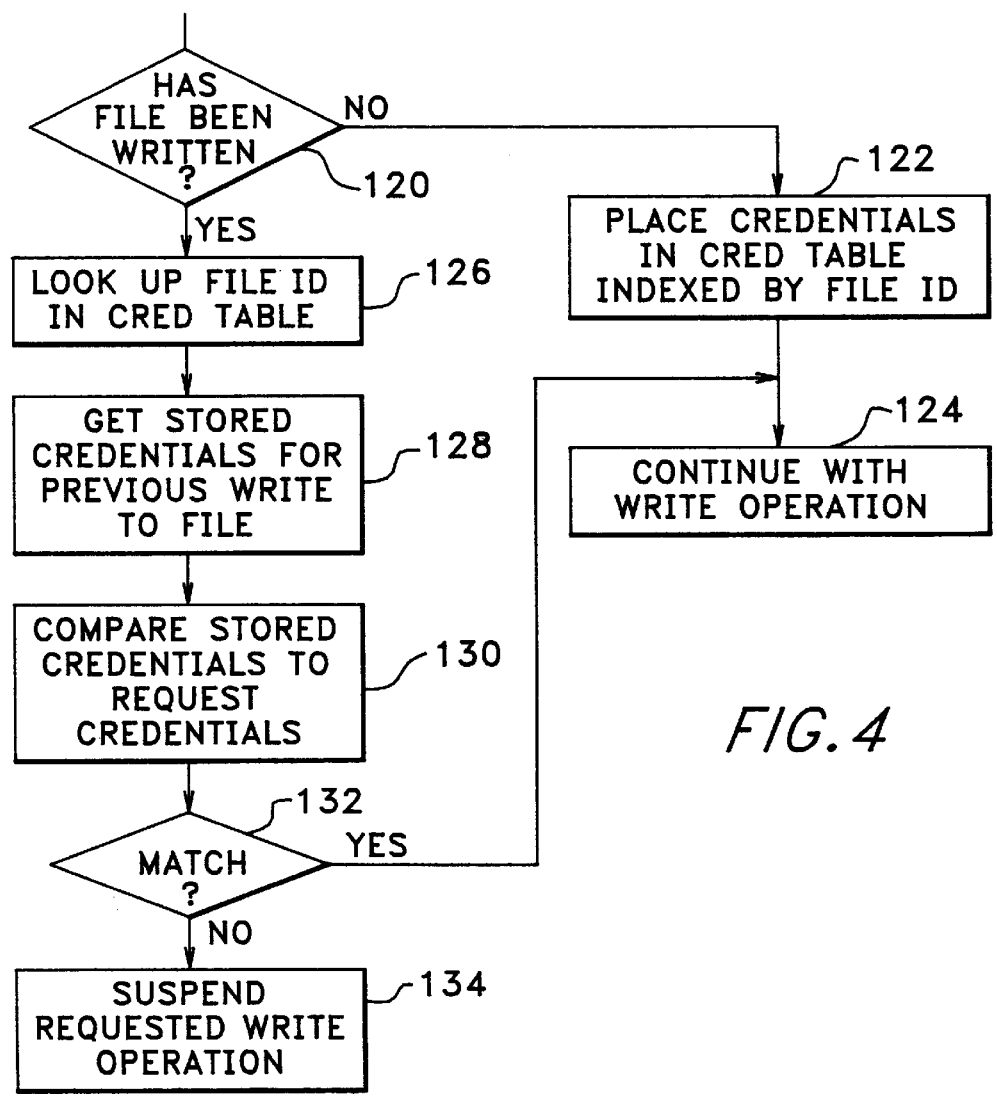
FIG. 4 shows the flow of logical operations at the client when performing disconnected write operations to client.

In a detailed implementation of the logical operations in FIG. 2A, FIG. 4 illustrates logical operations that would be used with a log file optimization write operation such as that described in the cross-referenced application entitled "Log File Optimization in a Client/Server Computing System." At the point where a disconnected write operation has been initiated, decision operation 120 in FIG. 4, tests whether the file requested for the disconnected write operation has already been written. If the file has not been previously written during a disconnected operation, the operation flow branches no to store module 122. Store module 122 places in a "CRED" (credentials) table the credentials for the present disconnected write file request. These credentials are indexed in the table by the file identification for the target file of the write request. After the credentials have been placed in the CRED table, operation 124 continues the write operation as for example described in the above cross-referenced application.

If decision operation 120 detects that the file has already been written during a disconnected write operation, the operation flow branches "Yes" from the decision operation 120 to look-up operation 126. Look-up operation 126 finds the file identification for the target file of the write operation. Then operation 128 gets the stored credentials at that file identification in the CRED table. These stored credentials represent the credentials for the first disconnected write to the target file.

The credentials for the present write request are transmitted with the request. Compare operation 130 now compares the stored credentials retrieved in get operation 128 with the request credentials, i.e. the credentials accompanying the write request. Decision operation 132 detects if the stored credentials match the request credentials. If there is a match, the logical operation flow branches yes to operation 124 to continue the write operation. In this case, the data in the present write request is added to the file. On the other hand, if the stored credentials do not match the request credentials, the logical operation flow branches "No" to suspend operation 134. Suspend operation 134 suspends the requested write operation.

Figure 5:
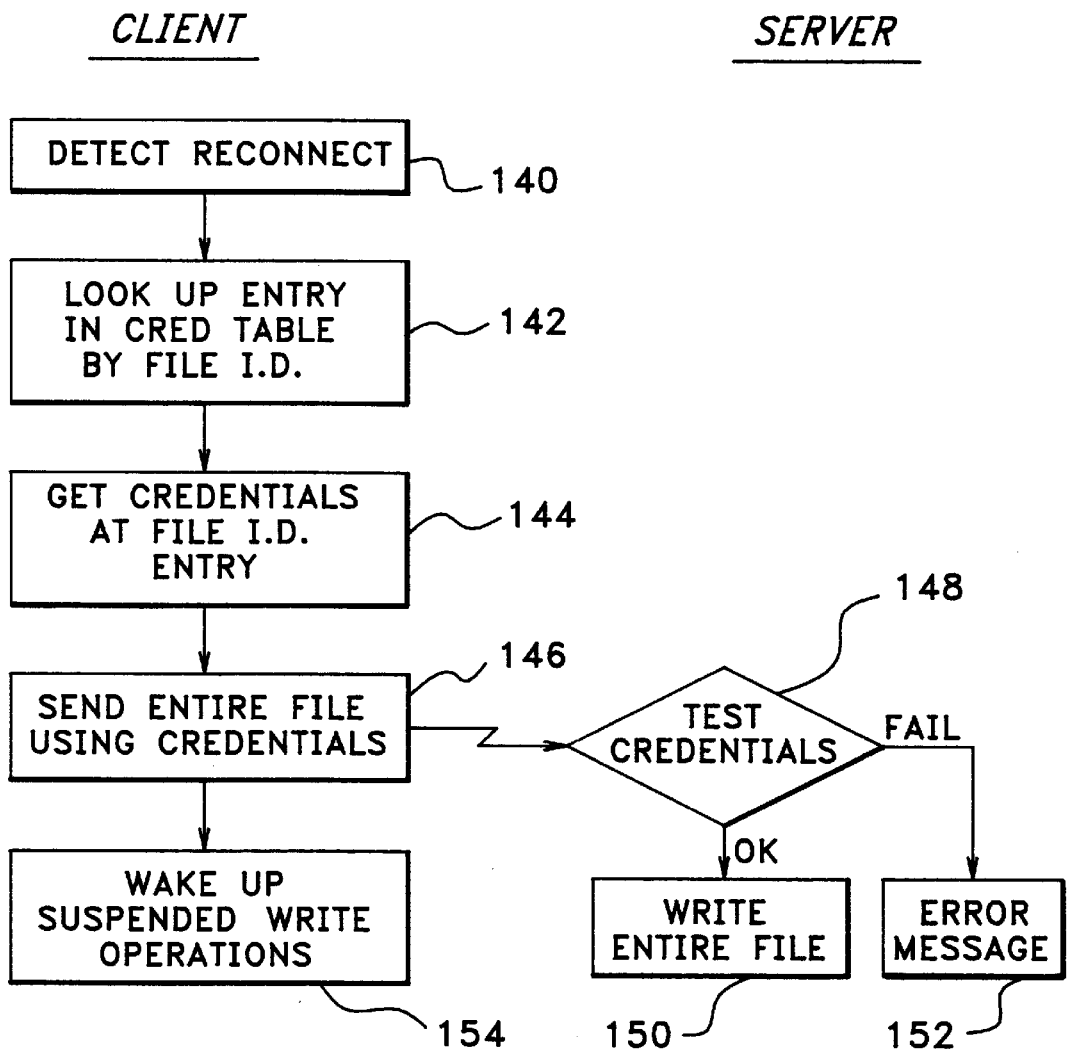
FIG. 5 shows the flow of logical operations at the client and server when the server is again available and the client file is to be copied to the server.

In FIG. 5 the logical operations that take place at the client and server when the server is again available to the client are shown. The client at operation 140 detects a reconnect condition between client and server. The reconnect condition may represent that the network is backup and connects the client and server, or it may represent that the server has come back up. In any event, the server is again available to the client. The client begins a copy-file-to-server routine by looking up in operation 142 an entry in the CRED table based on the file i.d. (identification) of the file to be copied to the server. After look-up operation 142 finds the file i.d., get operation 144 retrieves the credentials at that file i.d. entry in the CRED table. Send operation 146 then sends the entire file along with the credentials for the file as retrieved from the CRED table.

At the server, decision operation 148 tests the credentials for the file being received from the client. This test operation detects whether or not the write operation to the server is authorized. If the write operation is authorized, i.e. the credentials for the write operation indicate an authorized write operation, the operation flow branches "OK" from test operation 148 to write module 150. Write module 150 then proceeds to write the entire file to the server thereby copying the file written to the client during the disconnect period of time. If the credentials are not the credentials of an authorized user, test operation 148 fails and the logical operation branches to error message module 152. Error message module 152 will send an error message back to the client indicating the writes to that file during disconnect were not authorized and displaying an error message to the user.

Meanwhile at the client, wake-up operation 154 wakes up the suspended write operations. The suspended write operations are those write request whose request credentials did not match the stored credentials. Therefore, the write operations for these write requests were suspended by suspend operation 134 (FIG. 4). The suspended operations are now awakened and processed in the normal write operation with the server available to the client.

While the invention has been particularly shown and described with reference to a preferred embodiment thereof, it will be understood by those skilled in the art that various other changes in the form and details may be made therein without departing from the spirit and scope of the invention.

What is claimed is:

1. In a client/server computing system, apparatus for preventing unauthorized data written during disconnected writes at the client from being copied to the server when the server becomes available, said apparatus comprising:

a check module at the client, in response to a write to file request for a predetermined file, checking for a previous disconnected write to said predetermined file;

a client write module writing data contained in the write to file request to said predetermined file at the client if there is no change in credentials between credentials accompanying the write to file request and previous credentials for a previous disconnected write to said predetermined file; and a suspend module at the client suspending the write to file operation if there is a change in credentials between credentials accompanying the write to file request and said previous credentials.

2. The apparatus of claim 1 and in addition:

a storage module at the client storing credentials accompanying a write to file request if the write to file request is the first such request for said predetermined file, the credentials so stored thereafter forming said previous credentials.

3. The apparatus of claim 2 wherein said client writing module also writes data contained in the write to file request to said predetermined file if the write to file request is the first such request for said predetermined file.

4. The apparatus of claim 1 and in addition:

a send module at the client, in response to the server becoming available after disconnected write to file operations, sending said predetermined file along with said previous credentials to the server;

a server write module receiving said predetermined file and writing said predetermined file at the server if said previous credentials are accepted by the server.

5. The apparatus of claim 4 and in addition:

an awaken module at the client, in response to the server becoming available after disconnected write to file operations, awakening the write to file operations suspended by said suspend module.

6. In a client/server computing system having an optimized log file system for replaying client disconnect write operations to a server when the server becomes available to the client, a method for preventing data in unauthorized disconnect write operations to a target file at the client from being copied to the server when the server becomes available, said method comprising the steps of:

in response to a write request for a target file, said write request containing data and request credentials, detecting at the client whether or not the target file has already been written;

if said detecting step detects the target file has not already been written, placing the request credentials from the write request in a credentials table as stored credentials indexed by target file identifier and writing data from the write request to the target file;

if said detecting step detects the target file has already been written, matching the request credentials against the stored credentials;

if the request credentials are the same as the stored credentials, writing data from the write request to the target file; and if the request credentials are not the same as the stored credentials, suspending the write request at the client.

7. The method of claim 6 wherein said matching step comprises the steps of:

getting from the credentials table the stored credentials for the target file; and comparing the stored credentials to the request credentials and indicating whether or not the request credentials match the stored credentials.

8. The method of claim 6 and in addition the steps of:

detecting at the client that the server is available;

retrieving the stored credentials of the target file from the credentials table; and sending the target file along with the stored credentials to the server.

9. The method of claim 8 and in addition the steps of:

at the server, testing the stored credentials received with the target file from the client and indicating if the stored credentials are acceptable or unacceptable;

if the stored credentials are acceptable, writing the target file at the server;

if the stored credentials are unacceptable, sending an error message to the client.

10. The method of claim 6 and in addition the steps of:

detecting at the client that the server is still available; and waking up write operations at the client suspended by said suspending step.

11. The method of claim 10 and in addition the steps of:

retrieving the stored credentials of the target file from the credentials table; and sending the target file along with the stored credentials to the server.

12. The method of claim 11 and in addition the steps of:

at the server, testing the stored credentials received with the target file from the client and indicating if the stored credentials are acceptable or unacceptable;

if the stored credentials are acceptable, writing the target file at the server;

if the stored credentials are unacceptable, sending an error message to the client.

13. A computer program storage medium readable by a client/server computing system having an optimized log file system replaying client disconnect write operations to a server when the server becomes available to the client, said computer program storage medium encoding a computer program of instructions for executing a computer process to prevent data in unauthorized disconnect write operations to a target file at the client from being copied to the server when the server becomes available, said computer process comprising the steps of:

in response to a write request at the client for a target file, said write request containing data and request credentials, detecting at the client whether or not the target file has already been written;

if said detecting step detects the target file has not already been written, placing the request credentials from the write request in a credentials table as stored credentials indexed by target file identifier and writing data from the write request to the target file;

if said detecting step detects the target file has already been written, matching the request credentials against the stored credentials;

if the request credentials are the same as the stored credentials, writing data from the write request to the target file; and if the request credentials are not the same as the stored credentials, suspending the write request at the client.

14. The computer program storage medium of claim 13 where, in the computer program, the computer process step of matching comprises the steps of:

getting from the credentials table the stored credentials for the target file; and comparing the stored credentials to the request credentials and indicating whether or not the request credentials match the stored credentials.

15. The computer program storage medium of claim 14 where said computer process in the computer program further comprises the steps of:

detecting at the client that the server is available;

retrieving the stored credentials of the target file from the credentials table; and sending the target file along with the stored credentials to the server.

16. The computer program storage medium of claim 15 where said computer process in the computer program further comprises the steps of:

at the server, testing the stored credentials received with the target file from the client and indicating if the stored credentials are acceptable or unacceptable;

if the stored credentials are acceptable, writing the target file at the server;

if the stored credentials are unacceptable, sending an error message to the client.

17. A computer program tramsmission medium storing a computer program being downloaded to a client/server computing system, said client/server computing system having an optimized log file system replaying client disconnect write operations to a server when the server becomes available to the client, said computer program transmission medium encoding a computer program of instructions for executing a computer process for preventing data in unauthorized disconnect write operations written to a target file at the client from being copied from the target file to the server when the server becomes available, said computer process comprising the steps of:

in response to a write request at the client for a target file, said write request containing data and request credentials, detecting at the client whether or not the target file has already been written;

if said detecting step detects the target file has not already been written, placing the request credentials from the write request in a credentials table as stored credentials indexed by target file identifier and writing data from the write request to the target file;

if said detecting step detects the target file has already been written, matching the request credentials against the stored credentials;

if the request credentials are the same as the stored credentials, writing data from the write request to the target file; and if the request credentials are not the same as the stored credentials, suspending the write request at the client.

18. The computer program transmission medium of claim 17 where, in the computer program, the computer process step of matching comprises the steps of:

getting from the credentials table the stored credentials for the target file; and comparing the stored credentials to the request credentials and indicating whether or not the request credentials match the stored credentials.

19. The computer program transmission medium of claim 18 where said computer process in the computer program further comprises the steps of:

detecting at the client that the server is available;

retrieving the stored credentials of the target file from the credentials table; and sending the target file along with the stored credentials to the server.

20. The computer program transmission medium of claim 19 where said computer process in the computer program further comprises the steps of:

at the server, testing the stored credentials received with the target file from the client and indicating if the stored credentials are acceptable or unacceptable;

if the stored credentials are acceptable, writing the target file at the server;

if the stored credentials are unacceptable, sending an error message to the client.

* * * * *